United States Patent [15] 3,701,112

Hagelbarger [45] Oct. 24, 1972

[54] BALANCED, INCOMPLETE, BLOCK DESIGNS FOR CIRCUIT LINKS INTERCONNECTING SWITCHING NETWORK STAGES

[72] Inventor: David William Hagelbarger, Morris Twp., Morris County, N.J.

[73] Assignee: Bell Telephone Laboratories, Incorporated, Murray Hill, Berkeley Heights, N.J.

[22] Filed: June 4, 1971

[21] Appl. No.: 150,138

[52] U.S. Cl. .................... 340/172.5, 444/1
[51] Int. Cl. .................... H04l 11/00
[58] Field of Search .....444/1; 340/172.5; 179/15, 18

[56] References Cited

UNITED STATES PATENTS

| | | | |
|---|---|---|---|
| 3,432,621 | 3/1969 | Bininda et al | 179/18 |
| 3,461,242 | 8/1969 | Inose et al. | 179/15 |
| 3,469,035 | 9/1969 | Hillen | 179/18 |
| 3,546,390 | 12/1970 | Hackenberg et al | 179/18 |
| 3,557,316 | 1/1971 | Kimura et al. | 179/18 |

OTHER PUBLICATIONS

Horne; N. W., " The Wiring Process of a Design Automation System for Telephone Exchanges," British Joint Computer Conference, 1966, pp. 149– 155.

*Primary Examiner*—Raulfe B. Zache
*Attorney*—R. J. Guenther and Kenneth B. Hamlin

[57] ABSTRACT

A first stage of a switching network includes a plurality $v$ of switching matrices each including a predetermined number $r$ of input signal terminals and output signal terminals. At least one different pair of links for signal path connection is provided for outputs of each pair of first stage matrices to some one of $b$ k-input switching matrices of a second stage of the network. Links from any first stage matrix extend to only a portion of the output stage matrices and are arranged in accordance with a balanced, incomplete block design derived from combinatorial theory to distribute the link connections substantially evenly among the second stage matrices. The 2-stage network is itself a block design switching matrix that is useful for building higher order networks. A block design matrix also is combined, through time slot interchanging circuits or another switching stage, with a network of mirror image configuration so that signal path pairs established in the second network are the mirror image of path pairs established for the same communication through the first network.

26 Claims, 8 Drawing Figures

INVENTOR
D.W. HAGELBARGER
BY
Charles Scott Phelan
ATTORNEY

BALANCED, INCOMPLETE, BLOCK DESIGNS FOR CIRCUIT LINKS INTERCONNECTING SWITCHING NETWORK STAGES

BACKGROUND OF THE INVENTION

1. Field of the Invention

This invention relates to connecting link arrangements between adjacent stages of a multistage switching network.

2. Description of the Prior Art

Time division multiplex systems are known in the art and are utilized for combining, onto a single signal path, samples of different signals in interleaved sets. For example, signal samples from a plurality of telephone system call connections are interleaved in different time slots within a recurring time frame. Likewise, plural time division multiplex signal circuits have their respective signals concentrated onto a fewer number of circuits to provide a higher circuit utilization factor.

Various forms of path finding algorithms and logic circuits are utilized to determine the signal circuits and time slots which are available for use in establishing any particular call connection between a pair of telecommunication system subscribers. Information identifying calling and called subscribers, as well as the central office equipment utilized thereby and the time slots utilized by each for a particular call connection, are at least temporarily stored and employed in a programmed fashion to control logic gates in a system central office for steering signals of the call connection through the central office switching network in both the space and the time senses. Some form of time slot interchanging is also often employed to allow input and output circuits for a network to utilize different time slots in a time division multiplex frame.

Numerous time division multiplex signal system configurations are known in the art and are characterized in different ways. For example, one system characterization is that of a switch-store-switch arrangement wherein time slot interchanging circuits perform the storage function between two programmed switching functions which interconnect particular time division signal lines with predetermined time slot interchanging signal paths in correct time slots. An example of a communication system of the type just outlined is found in the H. Inose et al. U.S. Pat. Nos. 3,446,917 and 3,461,242. Other examples of time division and slot interchanging switching operations for different levels of operation in communication systems are found in the D. B. James et al. U.S. Pat. No. 2,957,949 and the H. Inose et al. U.S. Pat. No. 3,172,956.

In communication system offices which serve a large number of lines, multiple stages of switching are often required; and in some such offices the time slot interchanging function is performed after the multistage switching operations have been completed. Multistage switching arrangements are considered generally in "The Design of Switching Circuits" by W. Kiester, A. E. Ritchie, and S. H. Washburn, D. Van Nostrand Company, Inc., 1951. Section 14.4 is of particular interest. An example of a switching office in which time slot interchange type of functions is performed after principal switching operations is found in the M. J. Marcus U.S. Pat. No. 3,573,381. Multistage switching arrangements of the type taught by Marcus usually employ at least one of two different types of link connecting patterns between stages.

In one of the mentioned types of link arrangements, each switching matrix of the input stage is provided with a link to every switching matrix of the output stage so that each input matrix has access to every output matrix. However, this type of arrangement provides a great deal of interstage link redundancy which is not required for many switching applications, such as applications found in time division systems.

A second type of link connecting pattern between adjacent switching stages involves connections from each switching matrix of the input stage to a predetermined portion of the output stage matrices. The latter type of arrangement reduces link congestion between stages, but it lacks a desirable flexibility which allows any selectable pair of input stage matrices to be connected to a predetermined one of the output stage matrices. Consequently, a great deal of link and crosspoint switch redundancy is usually included in such prior art systems even though it is not essential to attain a desired traffic handling capability without substantial call signal blocking. Because of the lack of flexibility in the latter type of link connecting arrangement, it is often necessary, as in the aforementioned Marcus application, to utilize the second type of link connection pattern between a pair of switching networks which utilize the first type of link connection pattern. This need further amplifies the existing redundancy problem.

It is, therefore, one object of the present invention to improve multistage signal path switching systems.

A still further object is to arrange a 2-stage switching network so that it can perform a pairing set function with a minimum of interstage link connections.

Yet another object is to arrange a multistage switching network for establishing therethrough a pair of signal paths which together have substantially mirror image configurations in the input and output halves of the network.

SUMMARY OF THE INVENTION

The foregoing objects of the invention are realized in an illustrative embodiment wherein interconnecting links between adjacent stages of a multistage switching network are provided between a predetermined set of terminals of each switching array of a first stage and only selected switching arrays of the second stage. Those links are arranged in accordance with the combinatorial technique of balanced, incomplete, block designs.

It is one feature of the invention that a difference set solution to such a block design indicates all second stage arrays to which first stage arrays must be connected.

An additional feature is that two switching network stages which are so interconnected are capable of performing a type of pairing set function in that any pair of first stage switching arrays are connectible to a common, for that pair, one of the second stage arrays.

It is another feature that the block design has a $(b,v,r,k,)$-configuration wherein $b$ second stage matrices each have a set of $k$ terminals which are connectible with $v$ first stage arrays, each having a set of $r$ terminals, to provide $\lambda$ pairs of links between any pair of first stage arrays and an array of the second stage for each link pair.

Still another feature is that in one embodiment of the invention the numbers of first stage arrays and second stage arrays are equal, and the $r$ first stage connections and $k$ second stage connections are equal in number, so that the block design of interstage links is a symmetrical, balanced, incomplete, block design which is cyclic in that, given a block design difference set solution identifying second stage arrays to which a pair of first stage arrays are linked, the blocks for other pairs of first stage arrays are determinable therefrom by modulo arithmetic.

A further feature is that the arrays in the network stages may take different forms such as conventional crosspoint switching matrices in one or more stages, block design switching matrices in one or more stages, or groups of switching matrices in one or more stages.

BRIEF DESCRIPTION OF THE DRAWING

A more complete understanding of the invention and its various features, objects, and advantages may be obtained from the following detailed description when taken in conjunction with the appended claims and the attached drawing in which:

DETAILED DESCRIPTION

Figure 1:
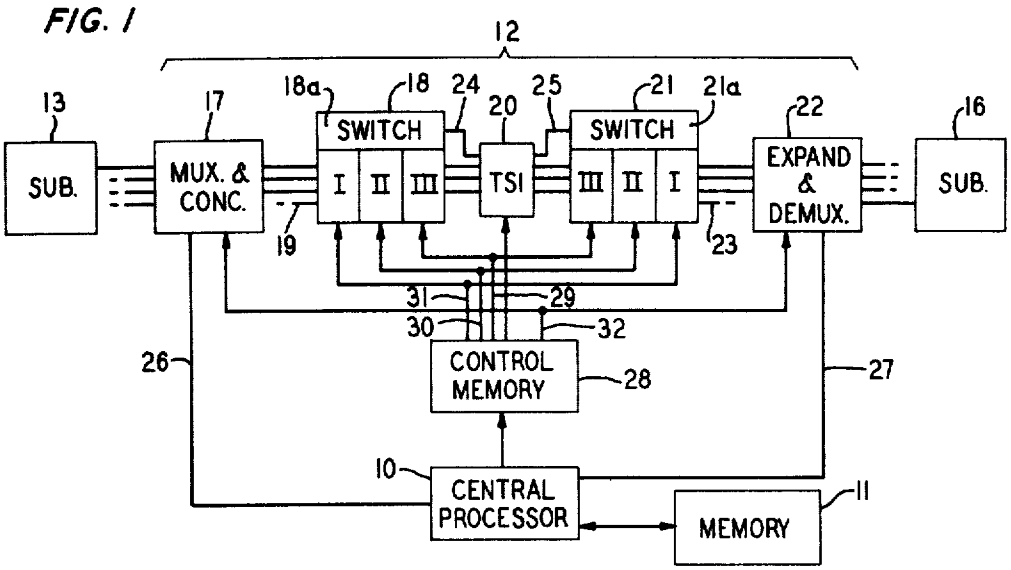
FIG. 1 is a simplified block and line diagram of a time division multiplex communication system utilizing the present invention.

In the time division multiplex communication system illustrated in FIG. 1, a central processor 10 cooperates with its associated memory 11 for controlling in a stored program fashion the functions of a time division multiplex central office 12 for interconnecting on a selectable basis a plurality of communication system subscribers, such as the subscribers 13 and 16. The system of FIG. 1 is generally herein described in connection with a signal flow from left to right, e.g., from the subscriber 13 transmitter to the subscriber 16 receiver. It will be understood, however, by those skilled in the art that, in this vein, subscriber 16 and other subscribers also have transmitters (not shown) at the left-hand side of the system drawing, and subscriber 13 and other subscribers also have receivers (not shown) at the right-hand side of the system drawing.

Within the central office 12, signal samples from multiple subscribers are time division multiplexed and concentrated by a multiplexer-concentrator circuit 17. The plural time division lines comprising the output of circuit 17 are applied to a multistage switching network 18 along with similar outputs from other multiplexing and concentrating circuits which are simply schematically represented by an input connection 19 to the switching network 18. Details of the switching network 18, which is advantageously a 3-stage network, including stages I, II, and III, will be hereinafter described. Outputs from each switching matrix in the final stage of network 18 are coupled through respective time slot transposing sections of a time slot interchanger 20, such as that taught in the mentioned Inose et al. patents. From interchanger 20, the signals are coupled through a further multistage switching network 21 which is advantageously a mirror image, with respect to the time slot interchanger 20, of the network 18. Outputs from switching network 21 are then applied through expander and demultiplexer circuit 22, and other similar circuits schematically represented by an output line 23, to the various subscriber stations such as that for the subscriber 16. Selectable switching network stage bypass paths 24 and 25 are provided to interchanger 20 in certain embodiments for a reason to be subsequently discussed.

For any given call connection, two paths or channels are established to allow bidirectional communication. These are sometimes called talking and listening paths, respectively, and they utilize the same pair of time slots but in transposed fashion on opposite sides of time slot interchanger 20. Thus, the call connection includes talking and listening signal paths which display time symmetry about an axis represented by the time slot interchanger 20. It will be shown that networks 18 and 20 also allow space symmetry for the paths.

Processor 10 controls the operation of the various circuits within the central office 12 in accordance with well-known stored program control techniques for such offices; and these techniques do not comprise part of the present invention. The processor accordingly includes arithmetic circuits for performing addition and subtraction, as well as other arithmetic operations, and for performing various digital logic manipulative functions as is well known for such processors.

Briefly, through supervision of incoming lines, schematically represented by a connection 26 from circuit 17 to processor 10 and a connection 27 from circuit 22 to processor 10, the incoming subscriber lines are identified along with corresponding equipment numbers for central office equipment to be used for particular calls. Likewise, time slots to be used by calling and called parties are determined by means of appropriate pathfinding algorithms to control the multiplexing, concentrating, switching, interchanging, expanding, and demultiplexing junctions during each successive time slot of a recurring time division multiplex signal frame. This control is exercised by translating equipment number and time slot information into corresponding control gate numbers and storing the control gate identification information in appropriate locations of control memories schematically represented by the control memory 28. The latter memory is provided with suitable output connections to the time slot interchanger 20 and to other circuits of the central office.

As taught in the aforementioned Inose et al. U.S. Pat. Nos. 3,446,917 and 3,461,242, a common, control memory output 29 is utilized for actuating switching matrix crosspoints in switching stages III of the multistage switching networks 18 and 21 on either side of the time slot interchanging circuitry 20. In similar fashion, a common output 30 from the control memory is utilized to control switching stages II, and a further common output 31 controls switching stages I. Likewise, a further common output 32 controls the mirror image functions of circuits 17 and 22. As will be hereinafter described in greater detail, interstage links are provided, at least between the switching stages II and III of each of the switching networks 18 and 21, to facilitate the provision of a pair of signal paths, which together have mirror image format with respect to interchanger 20, through the network without requiring an excessive number of interstage links, i.e., interstage links that are not really required to hold call blocking to a suitably low level for a desired system application.

Since switching networks 18 and 21 are advantageously mirror images of one another, details of only the network 18 will be hereinafter presented. Thus, the same description applies to network 21 but with appropriate interchange of correlative terms. For example, references to input and output would be interchanged and references to converging connections must be construed as diverging, all insofar as the same signal flow direction is concerned. Of course, in terms of the opposite signal flow direction, the description presented here would apply to network 21 directly but modification would be required for application to network 18.

Figure 2:
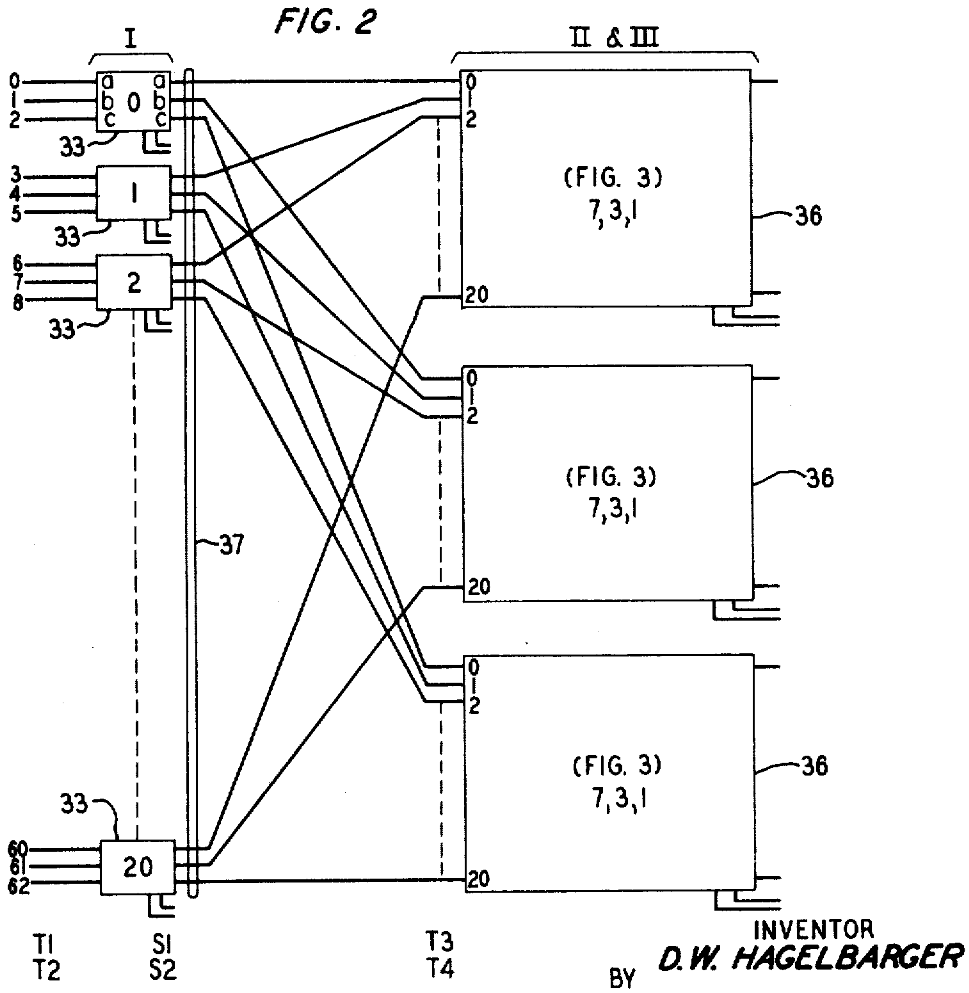
FIG. 2 is a simplified block and line diagram of a switching network employed in FIG. 1 and illustrating details of a prior art link connecting arrangement in combination with a multistage switching network in accordance with the present invention.

In FIG. 2 there is shown detail of a prior art type of interstage link arrangement between switching stage I and the combined stages II–III. The link arrangement and the stage I are not actually required for all realizations of the present invention as will subsequently become evident. Nevertheless, that link arrangement, in combination with the stages II and III, is useful for some applications.

Stage I includes a plurality of switching arrays which are advantageously 3×3 crosspoint switching matrices 33 of conventional type. That is, nine selectably controllable crosspoint switching devices, e.g., controllable coincidence gates, interconnect three row circuits to three column circuits. As is usual in switching network schematic illustrations, both row and column circuits are shown extending horizontally to conserve drawing space. However, a typical basic crosspoint matrix schematic detail, for matrices of FIG. 2 and other figures, is advantageously of the type shown in FIG. 2A. In that figure it can be seen that coincidence gates 40, provide selectable interconnection among three row circuits 41 and three column circuits 42 in accordance with selection control signals on the appropriate output of memory 28 for the stage in which the matrix is employed. That much of the matrix provides the 3×3 matrix function mentioned. In addition, two further column circuits 24' are similarly connectible to the row circuits 41 to provide the aforementioned bypass function for applications where it may be useful. For the left-to-right signal flow direction assumed in FIG. 1, inputs for 3×3 matrix functions are normally received on row circuits 41 and outputs provided on column circuits 42 in network 18. outputs are on the additional column circuits 24' for the bypass function. If the matrix is to be employed in network 21, the gates 40 are redirected to provide forward coupling from column circuits to row circuits, and the bypass circuits 24' would there be redesignated 25'.

Figure 2A:
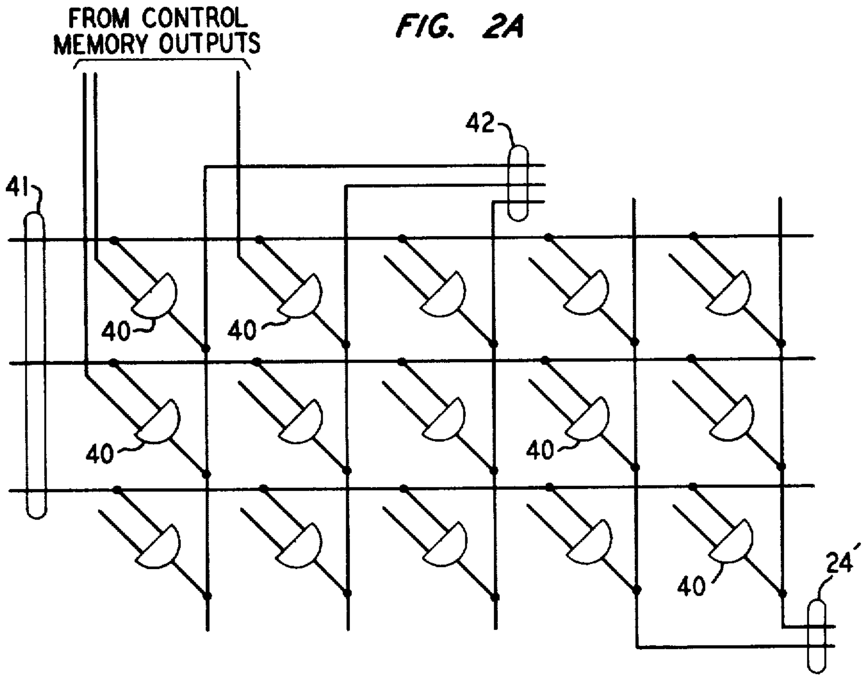
FIG. 2A is a schematic diagram of a crosspoint switching matrix.

Twenty-one matrices of the type shown in FIG. 2A are advantageously included in the embodiment of FIG. 2, and they are arranged in an ordered numerical sequence from 0 through 20 respectively. Crosspoint gates are actuated in appropriate time slots by control memory output signals on the output circuit 31 of FIG. 1. It will thus be seen that a total of 63 input lines numbered 0 through 62 are accommodated by the 21 3-input crosspoint switching matrices 33.

The switching network stages II–III accommodate the 63 outputs of stage I by three, 21-input, block design, switching matrices 36 which will be subsequently described in detail in connection with FIG. 3. The matrix schematic representation also includes reference characters identifying the particular block design advantageously employed in the matrix. Connecting links 37 between the stage I matrices 33 and the stage II–III matrices 36 are arrayed in a connection pattern forming the well-known general two-stage grid network whereby each matrix 33 has an output connection to every one of the matrices 36. The combination of stage I and links 37 with stages II–III provides network 18 with a larger number of alternate network paths for any call than are available from stages II–III. It also allows a call using any pair of the input matrices to be easily steered to the same matrix 36 in stages II–III so that the appropriate time slot transposition can be readily accomplished as taught by Inose et al.

If it is possible in stage I, or any other stage except the last in stage III, in a particular system application for the two paths of a call to use two different inputs to the same one of the stage input matrices, and if the advantage of mirror image call path pairs is to be realized, control logic must be provided to prevent the two paths of the call from prematurely converging and, thus, diverging before reaching time slot interchanger 20. This requirement is imposed because it was assumed that the Inose et al. type of time slot interchanger was used wherein an array of pulse shifters transpose time slots for call paths appearing in a common crosspoint switching matrix. Several ways are available to solve the problem of premature path pair convergence, and they will be only briefly outlined because that control logic design is of a type well-known in the art and is not essential to an understanding of the link arrangement plan of the present invention.

The most direct way to handle premature convergence is simply to cause pathfinding logic to require the parties in a call to use different time slots. If their respective talking paths converge prematurely on one matrix, the paths continue thereafter in those different time slots on one circuit through subsequent network stages to the final stage prior to the time slot interchanger 20. This is the type of operation primarily contemplated in the present description.

In another technique, the system pathfinding program or hardware (control portions 18a and 21a of networks 18 and 21) is adapted to detect input information that would require the premature use of a common matrix by a call path pair with the resulting premature path divergence. In this case the pathfinding program or hardware responds either by assigning different matrix numbers for the two paths of the call or by assigning the bypass path pair 24' for routing the call directly to a bypass section of the interchanger 20 for time slot transposition of bypassed calls and further assigning a corresponding bypass path pair for coupling the interchanger output to the appropriate mirror image stage of network 21. Similarly, it will be seen that, if networks 18 and 21 and interchanger 20 are replaced by a single network of the type to be described in FIG. 7, the pathfinding logic normally causes the calling and called parties to use the same time slot; and upon detection of premature convergence the matrix bypass circuits 24'' and 25'' are utilized to bypass the central stage of the network.

A different solution to the premature convergence problem is offered by the Marcus application queueing crosspoint. In a Marcus-type matrix, inputs on different rows of the same matrix can be readily transmitted in different time slots on a common output column circuit and continue in that way to the final stage before the time slot interchanger 20. Likewise, inputs in different time slots on the same row circuit can be readily transmitted on different output column circuits to the time slot interchanger.

Figure 3:
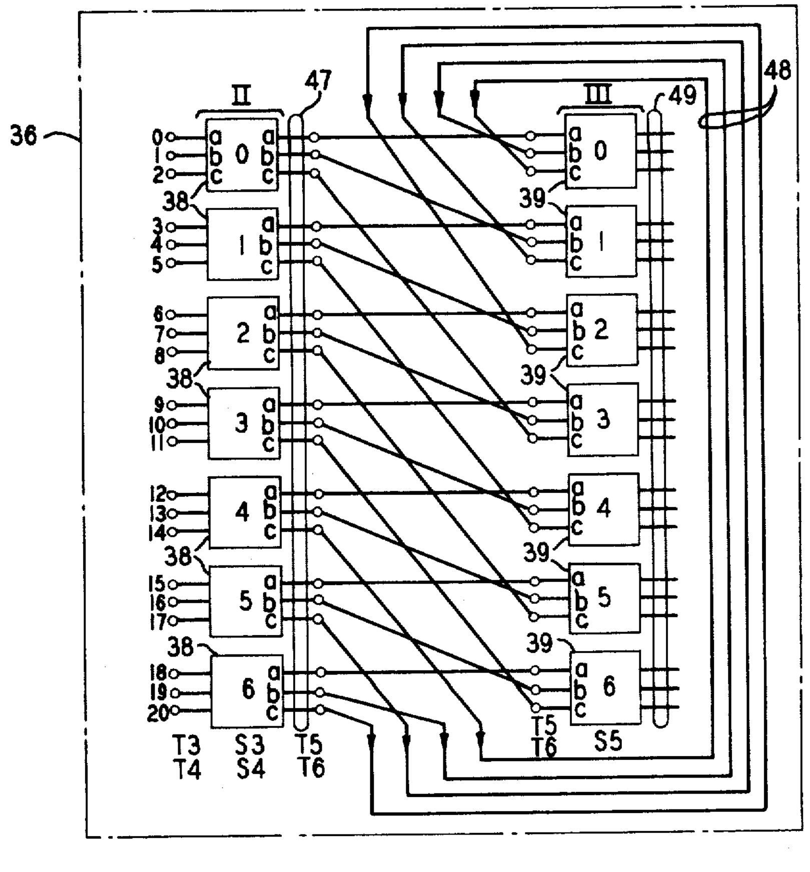
FIG. 3 is a block and line diagram of a multistage switching network in accordance with the invention.

In FIG. 3 are shown interconnections between network stages II and III for one of the switching matrices 36 in FIG. 2. Stage II comprises a plurality of crosspoint switching arrays such as the matrices 38 of the conventional type hereinbefore mentioned, in which any input row circuit and any output column circuit are selectably interconnected by actuating an appropriate crosspoint coincidence gate in response to a signal from output 30 of control memory 28 in FIG. 1. Seven of the matrices 38 are shown arranged in an ordered numerical sequence from 0 through 6. Each matrix 38 has three inputs and three outputs so that the seven matrices together accommodate 21 input signal circuits numbered 0 through 20. The three output terminals of each of the matrices 38 are designated *a*, *b*, and *c*, respectively.

Stage III of the switching network comprises a plurality of crosspoint switching arrays such as the matrices 39 which are also arranged in an ordered numerical sequence from 0 through 6 as shown in FIG. 3. Each of the matrices 39 is of the conventional crosspoint switching matrix type hereinbefore outlined in connection with stages I and II. Interstage connecting links 47 provide interconnecting signal paths among the output terminals *a* through *c* of the various stage II matrices, and the input terminals *a* through *c* of the stage III pairing set switches. Each link interconnects correspondingly lettered terminals in matrices of the two stages. Links 47 include four links designated 48 which provide end-around-type connections for completing link connection patterns between stage II matrices that are near the high numbered end of the stage II sequence and stage III matrices that are near the low numbered end of the sequence of the stage III switches. Since each stage II matrix has only three output connections and only one of the links 47 is applied to each such output connection, it is apparent that each of the stage II matrices is connected to only a portion of the stage III pairing set switch matrices. Nevertheless, in accordance with one aspect of the present invention, any pair of the stage II input matrices can be interconnected to some common one of the output pairing set switch matrices 39 for that input pair of matrices 38.

Each of the input stage II matrices 38 has its three output terminals connected through the links 47 to input terminals of different ones of the switches 39 which are spaced by different intervals from one another in the ordered numerical sequence of the stage III switches. For example, input matrix 0 is connected to adjacent output matrices 0 and 1 as well as the separated output matrix 3. These requirements for arranging the interstage connecting links 47 are met by a link arrangement in accordance with the principles of a finite projective pane, i.e., a balanced, incomplete, block design as understood in combinatorial theory. Explanations of such block designs and of finite projective planes are found in various texts. Examples are Chapters 7, 8, and 9 of The Carus Mathematical Monograph Number Fourteen entitled "Combinatorial Mathematics" by H. J. Ryser, published by The Mathematical Association of America and distributed by John Wiley and Sons, Inc., New York, 1963; and Chapters 10 and 11 of "Combinatorial Theory" by M. Hall, Jr., Blaisdell Publishing Company, Waltham, Massachusetts, 1967.

Block designs of the type just mentioned are sometimes also called $(b,v,r,k,\lambda)$-configurations. Basically a block design is a table of $b$ blocks, or rows, in which each block contains $k$ elements taken from a set of $v$ possible elements and each element occurs in $r$ blocks of the table. In terms of switching networks the variables of such a configuration indicate a network with $v$ input stage switching arrays each having $r$ output signal terminals, $b$ output switching arrays each having $k$ input signal terminals, and wherein the $r$ terminals and the $k$ terminals are interconnected by links arranged to provide $\lambda$ signal paths between each of the respective selectable different pairs of input stage arrays through $\lambda$ link path pairs to $\lambda$ of the output stage arrays.

Figure 5:
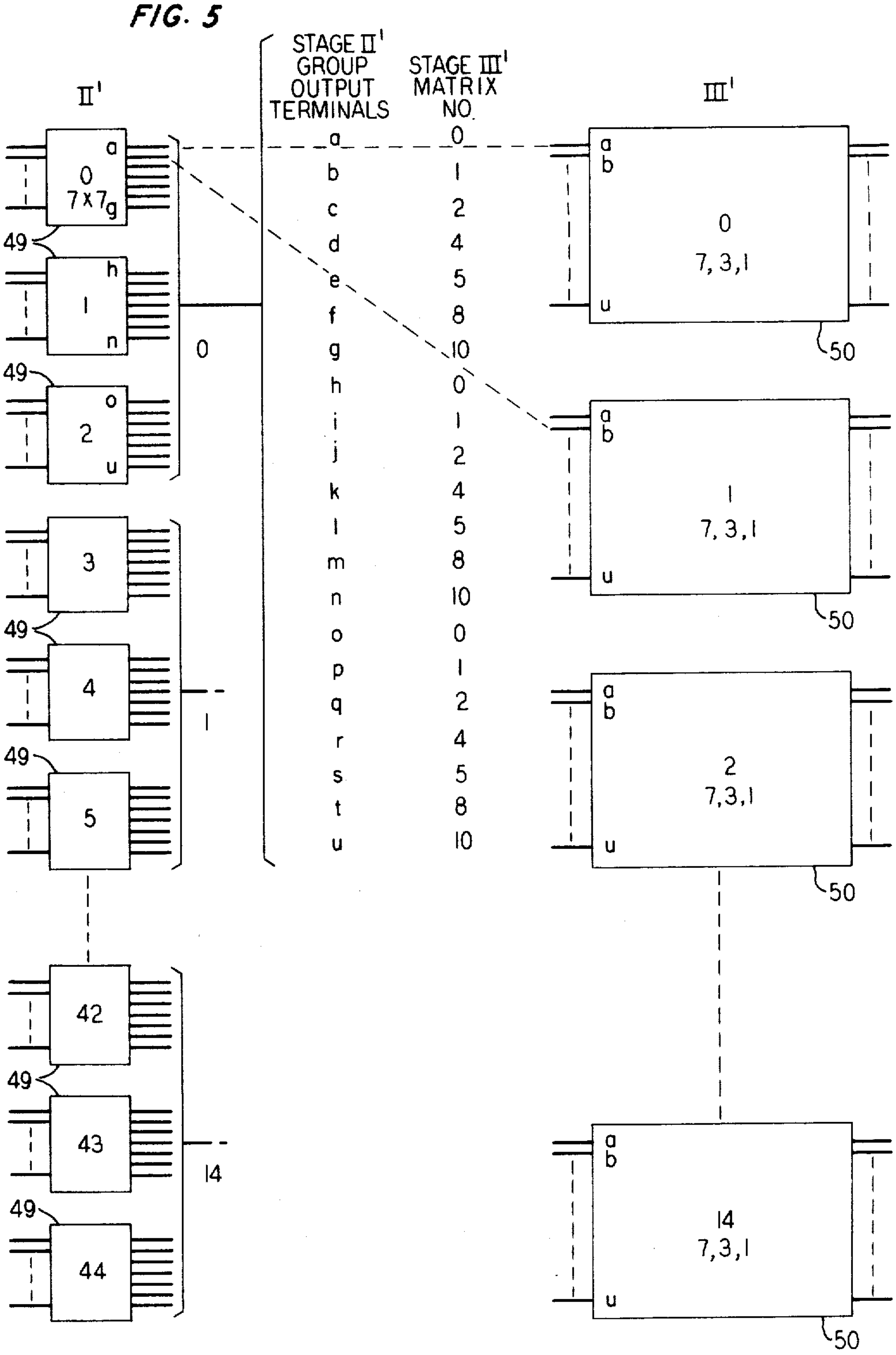
FIGS. 5 and 6 are schematic representations of different 2-stage network embodiments of the invention for serving much larger numbers of time division multiplex lines than are possible with the embodiment of FIG. 3.
Figure 6:
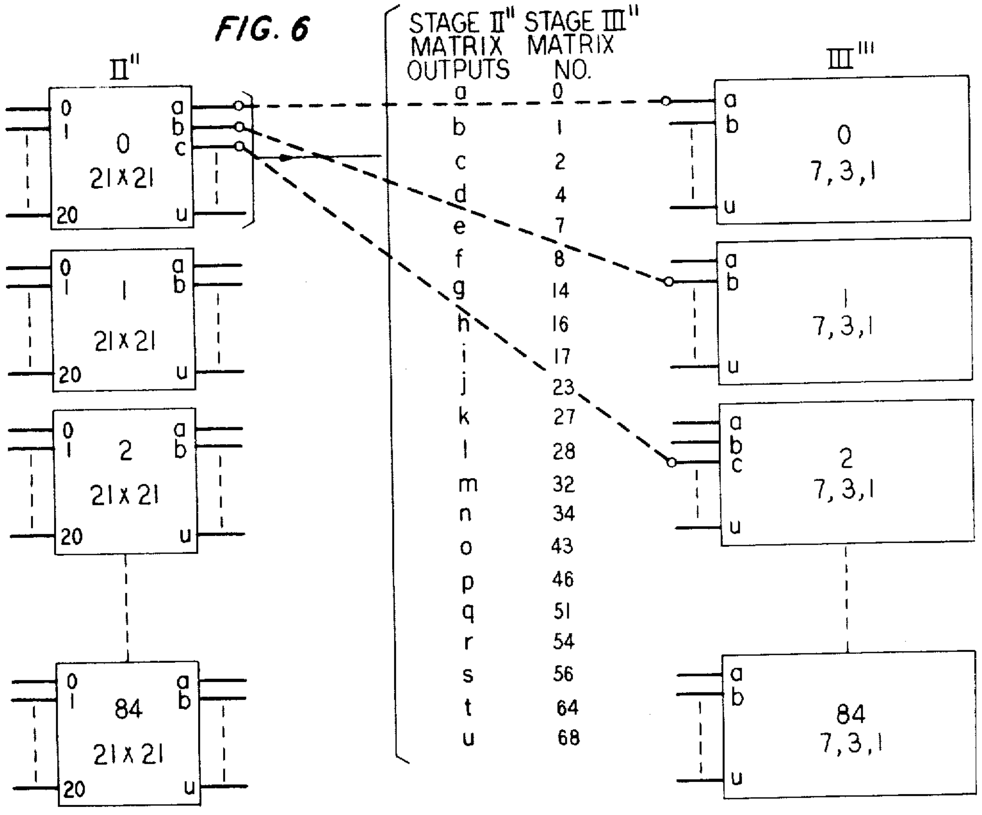

Many block design solutions have been worked out by mathematical techniques. A number of those solutions are found in Appendix I of the Hall text at pages 290 through 298. The link connection pattern of FIG. 3 conforms to the block design No. 1 in the Table 1 of the Hall Appendix I. Similarly, the connecting link arrangement which will be hereinafter described in connection with FIG. 5 is based upon the block design No. 16 in the Hall table. The block design utilized for the embodiment to be described in connection with FIG. 6 is not included in the Hall table but was worked out utilizing the aforementioned mathematical techniques set forth in either of the aforementioned texts.

In the block design utilized for FIG. 3 it will be noted that $v=b$ and $r=k$, i.e., the numbers of arrays in stages II and III are equal (seven in each case) and the numbers of link-connected terminals per array in stages II and III are equal (three in each case). A block design with such equalities is called a symmetric design, and it may have cyclic properties. If the design is cyclic, any block is a difference set, i.e., a commonly used compact notation describing the block design. For convenience of pathfinding, it is advantageous to utilize a block design having cyclic properties, although other highly symmetrical designs also have convenient pathfinding rules, e.g., design number 10 in the Hall Appendix I. Thus, given the difference set solution of the block design, the numbers of the solution are used as any one of the bocks; and other blocks in an ordered sequence of the blocks of the design are derived by adding one modulo $v$ to the elements of the preceding block in the sequence.

Thus, in FIG. 3, given the numbers of the stage III matrices 39 to which one stage II matrix 38 is connected, the other blocks are readily determinable by modulo arithmetic for other matrices 38. The Hall table shows that the difference set solution for the 7,7,3,3,1 block design is 1,2,4 mod 7. That solution is advantageously assigned as the block for the stage II matrix 1. The meaning of that block is that output lines *a* through *c* of the input matrix 38 that is numbered 1 in the input stage sequence should be connected to switch matrices 1, 2, and 4 of the output stage III. (It is useful to observe here that in strict block design terminology as applied to a switching network, the noun "block" should refer to the set of numbers identifying first stage network arrays from which links extend to a particular second stage array. There is no convenient term of art to describe the correlative set of numbers, which is convenient for network descriptions, identifying second stage network arrays to which links extend from a particular first stage array. However, for symmetrical block designs the term "block" is equally valid for either the from-set or the to-set. Although the invention is not limited to either symmetrical or nonsymmetrical block design networks, the former have been found to be the most useful for switching networks; and they are, therefore, the type illustrated herein. Thus, the term "block" is for convenience normally herein employed with reference to the set of numbers identifying second stage network arrays to which links extend from a particular first stage array.) Given the block for one matrix 38, similar blocks for each other one of the input stage matrices 38 can be derived by adding 1 modulo 7 to the members of the block of the preceding input matrix 38 in the ordered numerical sequence of such matrices. Such a derivation procedure allows the construction of the following table of connection links that can be traced in FIG. 3:

TABLE I

Finite Projective Plane (Block Design) 7, 3, 1

| Stage II Matrix Number | Stage III Matrix NUmber for Stage II Matrix Terminals | | |
|---|---|---|---|
| | a | b | c |
| 0 | 0 | 1 | 3 |
| 1 | 1 | 2 | 4 |
| 2 | 2 | 3 | 5 |
| 3 | 3 | 4 | 6 |
| 4 | 4 | 5 | 0 |
| 5 | 5 | 6 | 1 |
| 6 | 6 | 0 | 2 |

Since connecting links 47 always extend between terminals in stage II and terminals in stage III having the same reference letter, it will be seen that the Table I above provides a complete map of the way that the links 47 are to be connected between stages II and III. It is readily apparent from Table I that the blocks for any pair of stage II matrices, e.g., 0 and 5, have a common stage III matrix, number 1 in this example.

Having achieved the desired connection pattern of links 47 between stages II and III in FIG. 3, it is now necessary, for any given call, to find a suitable path pair through the network for interconnecting calling and called parties. The following pathfinding Table II is derived, for stage II matrix 0, from the foregoing Table I by noting for each other stage II matrix 38, which is to be connectible in a pair with matrix 0, the number of the output switch matrix 39 which is common to the blocks for such pair of input matrices:

TABLE II

Pathfinding for FIG. 3

| Stage II - Pair Matrix 0 With Matrix: | stage II matrix 0 Terminal | Common Matrix 39 | Terminal of Other Stage II Matrix |
|---|---|---|---|
| 1 | b | 1 | a |
| 2 | c | 3 | b |
| 3 | c | 3 | a |
| 4 | a | 0 | c |
| 5 | b | 1 | c |
| 6 | a | 0 | b |

To demonstrate the use of Table II, assume in FIGS. 2 and 3 that the 63 input lines to the matrices 33 of stage I are connected to 63 different telephones, respectively. The contents of the three right-hand columns of Table II are stored in memory 11 as three-character words at word locations corresponding to the numbers in the left-hand column.

Figure 4:
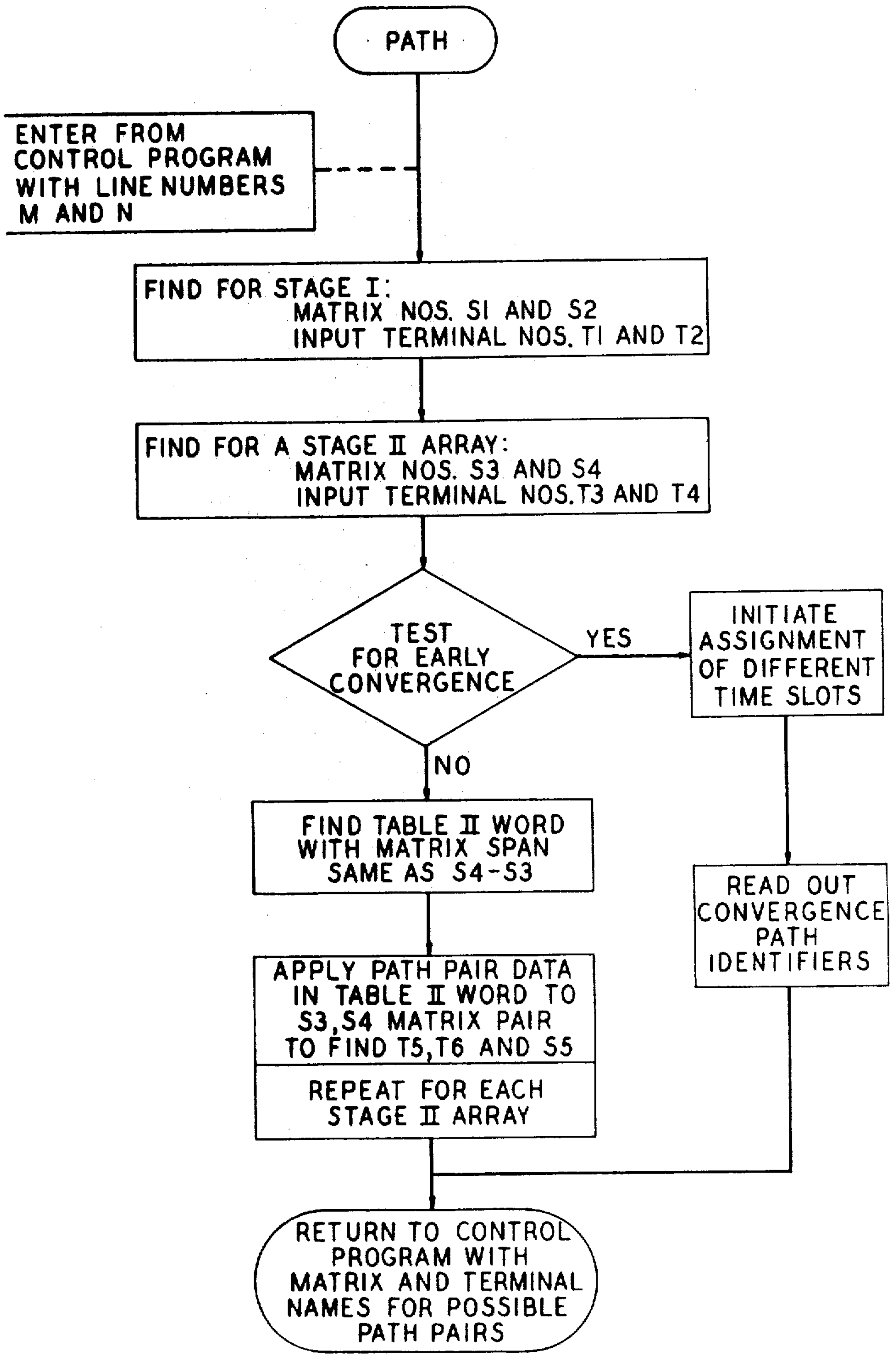
FIG. 4 is a flow chart for a pathfinding algorithm for the network of FIG. 3.

FIG. 4 illustrates a flow diagram of a pathfinding algorithm for interconnecting two telephones, e.g., the telephones 5 and 12, in path pair through stages I and II to a common matrix 39 in stage III. The controlling program for office 12 supplies from line scanning operations the numbers 5 and 12 of the telephone lines which are to be interconnected by providing links that converge at a stage III matrix 39. A subroutine PATH is called by the control program for performing this particular pathfinding operation. In the example shown, three path pairs are identified as the subroutine output; and the control program then selects one that is not busy for utilizing the matrix and terminal identifications for deriving corresponding crosspoint names that are stored in the appropriate control memory locations.

When the subroutine PATH is called, the control program provides calling and called line numbers M and N. Those numbers are used first to determine the stage I matrix numbers $S1$ and $S2$ and input terminal numbers $T1$ and T2 on such matrices. One way to do this for FIG. 2 is to divide line numbers by three (the number of input lines per matrix) to get the matrix numbers and use three times the fractional part of each quotient as the corresponding input terminal number. This makes $S1=1$, $S2=4$, $T1=2$, and $T2=0$ for lines 5 and 12 in FIG. 2.

Next, by the same technique, the stage I matrix numbers $S1$ and $S2$ are employed to determine, for any stage II–III array 36, the stage II matrix 38 numbers $S3$ and $S4$ and input terminals $T3$ and $T4$ of each. Those matrix numbers necessarily fix the stage I matrix output terminal numbers. Thus, for one path pair into FIG. 3, $S3=$ o, $S4=1$, $T3=1$, and $T4=1$.

Now a test for early convergence is run by checking the relative magnitudes of $S1$ and $S2$ and the relative magnitudes of $S3$ and $S4$. If premature convergence is found, connection data for a predetermined circuit is read out of memory to set up a single path through the remainder of the network to time slot interchanger 20; and an output is generated to cause the control program to put the calling and called parties on different time slots if they were not already in such time slots. The starting point for that single path is defined, in the worst case of stage I convergence, as soon as an $S1$ value is determined because that fixes $T3$ and $S3$ for any given stage II array since premature convergence means $S1 = S2$; and thereafter it is required that $S3 = S4$. Then it is only necessary to specify an arbitrary value, e.g., zero, for $T5$; and $S5$ is necessarily fixed. If there is no indication of premature convergence, Table II must be entered to obtain further connection data.

In order to enter Table II the difference between the stage II matrix numbers $S3$ and $S4$ is determined in order to translate that matrix pair back to a corresponding pair, one having the same matrix number span, in the Table II. The correspondence arises from the fact that the block design for FIG. 3 is a cyclic design wherein the blocks are derived by modulo arithmetic. Therefore, any pair of stage II matrices in a given array must have a span between them corresponding to the span between the key matrix number 0 in Table II and one of the other matrices on the table. Since the difference between the numbers of matrices $S3 = 0$ and $S4 = 1$ in an array of stage II is equal to one in the illustrative example, the connection sought between those matrices is given directly in the first line of Table II. Had $S3$ and $S4$ been 18 and 19, the same line would be used; and had $S3$ and $S4$ been 13 and 19, the last line on the table would be used.

In the next step of the pathfinding algorithm, it is determined from Table II, by reading out of memory 11 the word corresponding to stage II matrix number 1, that to connect matrix 0 in a path pair with matrix 1 in stage II it is necessary to utilize output terminal *b*, i.e., $T5$, of the stage II matrix number 0 and output terminal *a*, i.e., $T6$, of the stage II matrix 1. Both of those terminals $T5$ and $T6$ are interconnected by way of links 47 to the common stage III switch matrix number 1, i.e., $S5$, in the ordered numerical sequence of matrices 39 in output stage III. Even where the stage II matrix numbers are not directly found in Table II, the output terminal numbers used are the same as those for a matrix pair of the same span on the table.

Now the common stage III matrix number must be found. In the second column from the right in Table II there is a matrix number and that is modified by adding thereto the subtrahend of the difference, determined for entering Table II, in order to find the corresponding stage III matrix $S5$ for the stage II matrix pair used to find a table entry. For the case presently assumed, that subtrahend, $S3$, was the number zero; and adding zero to the common stage III matrix No. 1 in the first line of Table II yields no change in this instance. Thus $S5 = 1$.

Next the data just determined for one stage II array is translated into corresponding data for the other two arrays, and then there is a return to the control program with the three sets of terminal and matrix identifications just determined. The control program selects a set that is not busy, and those identifications are translated to corresponding crosspoint switch names in stages I, II, and III. The latter names are stored in proper time slot locations of control memory 28 to be utilized for actuating those switches in stages I, II, and III.

In order to establish a talking path from telephone 5 to telephone 12, control memory 28 output signals on output 31 are provided in appropriate time slots to select a crosspoint in stage I matrix No. 1 for connecting telephone 5 via input terminal *c* to output terminal *a* of that matrix, and for connecting telephone 12 via input terminal *a* to output terminal *a* of stage I matrix No. 4. Output terminals *a* of stage I matrix Nos. 1 and 4 are linked to input terminal *b* of stage II matrix Nos. 0 and 1 in the upper array 36 of FIG. 2. Control memory output signals on output 30, in appropriate time slots, select a crosspoint in stage II matrix 0 for connecting input terminal *b* to output terminal *b*, and in stage II matrix 1 for connecting input terminal *b* to output terminal *a*. The latter output terminals *b* and *a* are linked to stage III matrix No. 1 input terminals *b* and *a*; and control memory output 29 is provided, in appropriate time slots, for selecting in the matrix No. 1 of stage III the cross points which must be enabled for interconnecting the input terminals *b* and *a* of the matrix to appropriate output terminals thereof for further extension through the overall network.

It has now been shown that the block design depicted in FIG. 3 for connecting links 47 allows the links from any pair of stage II matrices to converge separately at some stage III crosspoint switching matrix. That convergence is available even though each stage II matrix is not connected to all of the stage III matrices. This pairing, with convergence, type of property allows the path convergence needed for practical, symmetrical, mirror image, calling, circuit path pairs through a central office in order to gain the advantages of control memory hardware reduction without requiring excessive link redundancy and congestion. Furthermore, those advantages are provided with a pattern of links which is substantially evenly distributed among the matrices of stage III.

An illustrative program listing is presented in Appendix A for implementing the FIG. 4 algorithm. The FOCAL program language is utilized for that program on a PDP–8/I data processor of the Digital Equipment Corporation of Maynard, Massachusetts, for performing the functions of the processor 10 of FIG. 1. A discussion of that language may be found, for example, in Introduction to Programming - Small Computer Handbook Series, Chapter 9, entitled "FOCAL Programming," copyright 1968, by Digital Equipment Corporation.

Turning now to FIG. 5, there is shown a multistage switching network for stages corresponding to II AND III previously discussed but here designated II′ and III′. The embodiment of FIG. 5 is adapted to accommodate a substantially larger number of input lines than the network forms hereinbefore discussed. Existing tables of block designs will not always include a cyclic design that is convenient for use for a desired number of lines. In such cases an existing design is utilized *n* times to achieve the desired size, and FIG. 5 illustrates a case wherein $n = 3$. In that embodiment the input stage II′ includes switching arrays in the form of 15 groups of 7×7 switching matrices arranged with three such matrices per group so that a total of 315 input lines can be accommodated. The input stage II' matrices 49 are further designated in an ordered numerical sequence as the matrices O through 44; and the groups are similarly arranged in an ordered numerical sequence O through 14.

Stage III' includes plural switching arrays in the form of fifteen block design switching matrices 50 which are also arranged in the ordered numerical sequence 0 through 14. Each of the latter matrices includes 21 input terminals and is of the same configuration as the network illustrated in FIG. 3. Consequently, each matrix 50 also comprises a matrix group because it has seven 3×3 matrices in its input stage. The matrix 50 input terminals are in FIG. 5, designated *a* through *u* in each matrix.

Within a group of the input stage II' matrices 49, the 21 output terminals are respectively designated *a* through *u*. For example, in group No. 1 matrix No. 3 has terminals *a–g*, matrix No. 4 has terminals *h–n*, and matrix No. 5 has terminals *o–u*. Output terminals of stage II' groups are interconnected through an arrangement of interstage links which is only schematically represented in FIG. 5 because of the substantial confusion which would result from attempting to illustrate a connection pattern for 315 connection links. The schematic representation includes a bracketed table of corresponding connections for matrix output terminals of the input matrix group No. 0. The entire table shown in FIG. 5 corresponds for that embodiment to the first line of Table I for the FIG. 3 embodiment. In FIG. 5 the table indicates, for each group No. 0 output terminal, the output stage III' matrix number which has an input terminal of corresponding letter designation from that input terminal group.

Connecting links in FIG. 5 are organized in accordance with a modified form of symmetrical balanced incomplete block design. The design is basically a ($v$, $k$, $\lambda$)-configuration in which $v = 15$, $k = 7$, and $\lambda = 3$. Thus, there are 15 input switching matrix groups in stage II' which are linked to 15 output switching matrix groups in stage III' so that three pairs of signal paths can be established from any pair of stage II' groups to a corresponding set of three stage III' groups. Superimposed on the basic (15,7,3)-configuration is related detail of matrix interconnection. The three 7-output matrices 49 of each stage II' group are connected by seven links each to seven of the stage III' groups by three replications of the block design difference set for its group. Connections of the latter type allow three link paths from each stage II' matrix group to each stage III' group matrix 50 within the difference set for that stage II' group. Restating the FIG. 5 features in conventional block design terminology, $v = 15$ objects (input stage II' groups) are linked into $b = 15$ blocks (output stage III' matrices 50). That linkage is such that each block contains exactly $k = 7$ distinct objects (each matrix 50 has inputs from seven stage II' arrays and among such inputs there are $n = 3$ inputs from each such stage II' array to utilize fully the $nk = 21$ input connections of the matrix 50). The linkage is also such that each object occurs in exactly $r = 7$ different blocks (each input stage II' array is linked to seven matrices 50 and such linkages include $n = 3$ such links to each such matrix 50 to utilize fully the $nr = 21$ output connections from the stage II' array). Linkages are also such that every pair of distinct objects (each pair of stage II' groups) occurs together (is linked by converging links) in exactly $\lambda = 3$ blocks (matrices 50).

To demonstrate the three paths to stage III' matrices which are available from the stage II' group No. 0 to the stage III' matrix No. 0, the table shows a connecting link between terminals *a* of input matrix No. 0 and input matrix No. 0, a second link between terminals *h* of input matrix No. 1 and output matrix No. 0, and a third link between the *o* terminals of input matrix No. 2 and output matrix No. 0.

Similar link tables can be constructed from the one shown in FIG. 5 for each of the other 14 groups of stage II' by simply increasing the stage III' matrix numbers in the right-hand column of the table by one modulo 15, for each succeeding stage II' matrix group in the sequence 0 to 14. For example, from the difference set 0,1,2,4,5,8,0 for group No. 0 there is derived for group No. 1 the difference set 1,2,3,5,6,9,11. Groups 0 and 1 have in both their difference sets the stage III' matrix numbers 1,2, and 5 as the three to which the links from groups 0 and 1 must converge. Similarly the difference set for stage II' group No. 2 must be 2,3,4,6,7,10,12; and that shows that link pairs from groups 0 and 2 are converged into stage III' matrices 2,4, and 10 which are common to their difference sets. By further similar constructions, all matrix output terminals of input stage II' and all stage III' input terminals are utilized one time.

Pathfinding for the embodiment of FIG. 5 is conducted utilizing an algorithm which is similar to that employed for pathfinding with respect to the network of FIG. 3. Thus, in order to locate a path through the connecting links for converging two stage II' matrix groups to a common stage III' matrix 50, the algorithm must be modified to include logic steps for determining which of the three possible FIG. 5, group-to-group, link, path pairs should be utilized. This determination must be made as a function of the availability of the three common stage III' matrices and as a function of any priority system that may be employed in a central office involved. Availability is readily determined by techniques of the type normally employed in the prior art for determining the availability of any particular time division multiplex system hardware in a particular time slot.

The pathfinding algorithm for FIG. 5 is further modified to the extent that it must be run twice with different data for each call. One run is required to locate a pair of links between stages II' and III', and another run is required to locate a pair of links between stages of the chosen matrix 50 in stage III'. Furthermore, the first-mentioned run must have associated therewith a subroutine for picking within each stage II' group one of the three possible paths to the selected stage III' matrix 50.

In FIG. 6 there is shown, by a schematic representation of the type utilized in FIG. 5, a multistage switching network which is even larger than that employed in FIG. 5. The block design of interstage connecting links is an (85,21,5)-configuration for interconnecting a stage II'', which includes 85 conventional crosspoint switching matrices, with 85, 21-input, stage III'', block design matrices of the (7,3,1)-configuration. Each of the input stage matrices has 21 input connections and 21 output connections so that the overall network can serve 1,785 input lines. Those lines would represent an office serving 114,240 telephones, assuming a time division frame size of 64 subscriber time slots per input line. The type of interstage link pattern in FIG. 6 is more similar to that shown in FIG. 3 than that shown in FIG. 5 because it is regular in the sense that it provides direct convergence among any pair of input stage matrices. However in FIG. 6, five possible path pairs are provided for establishing the link convergence from any pair of stage II'' matrices to stage III''.

In the schematic representation of FIG. 6, the bracketed table between network stages indicates the block connection pattern for the output terminals *a* through *u* of stage II'' matrix 0, in much the same fashion that a similar table indicated link connections for input matrix groups in FIG. 5. Here again, the blocks for other stage II'' matrices are derived from the block shown for the matrix No. 0 by adding one modulo 85 to each element of the illustrated block. For example, convergence for stage II'' matrices 0 and 1 is to stage III'' matrices 1,2,8,17, and 28 as determined by developing the stage No. 1 block and selecting common matrix numbers.

Pathfinding for the embodiment of FIG. 6 is accomplished in accordance with an algorithm of the type utilized for FIG. 3, but modified as described in connection with FIG. 5 to accomplish a selection among the five possible connection path pairs between stages II'' and III'' and to find a path between stages of a selected stage III'' block design matrix.

Figure 7:
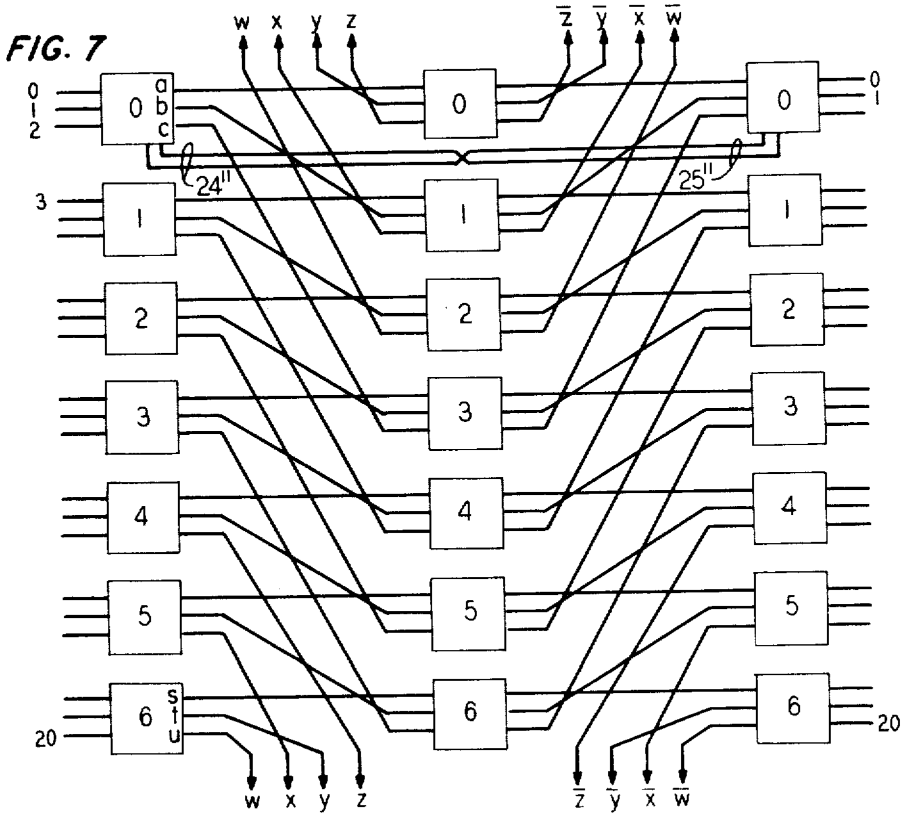
FIG. 7 is a block and line diagram of a block design switching matrix for performing the function of one of the 21×21 matrices of FIG. 6.

FIG. 7 illustrates a modified form of the 21×21 input stage matrices of FIG. 6. It will be understood that if each 21×21 matrix is a conventional crosspoint switching matrix, 441 crosspoint switches are required for such a matrix. However, FIG. 7 illustrates a way in which the present invention can be employed to realize the 21×21 switching matrix function with only 189 crosspoint switches. Thus, in FIG. 7 the 21×21 matrix is formed of a pair of mirror image, back-to-back, (7,3,1)-configuration, twenty-one input multistage networks of the type illustrated in FIG. 3. Two complete FIG. 3 networks are not required, however, since the two networks can share a common central stage.

In FIG. 7 each stage comprises seven 3×3 matrices. Outputs of the first stage and inputs of the second stage are interconnected in accordance with the (7,3,1)-configuration shown in FIG. 3. End-around connections are simply indicated by letters *w* through *z*. Similarly, outputs of the second stage and inputs of the third stage are interconnected in accordance with a mirror image of that same block design with end-around connections $\bar{z}$ through $\bar{w}$. Since each block design utilized is capable of providing from any pair of input matrices a pair of links which converge to a common output stage matrix, and the mirror image network performs the complementary divergence, any input matrix on the left of FIG. 7 can be connected to any output matrix on the right of FIG. 7. A complementary path is also available through the network of FIG. 7 in accordance with the descriptions of FIG. 3. Furthermore, since any of the switching matrices employed in FIG. 7 is capable of connecting any of its input connections to any one of its output connections, there is also a further connection path from any input terminal at the left of FIG. 7 to a correspondingly designated output terminal at the right of FIG. 7.

Associated with the upper row of matrices in the network of FIG. 7 are bypass circuits pairs 24'' and 25'' interconnected by a circuit transposition at the central stage of the network. That transposition represents the same transposition normally achieved by the bypassed matrices of that central stage. Similar bypass connections are provided in other rows of the FIG. 7 network, but they are not shown to avoid undue complication of the drawing. The mentioned bypass circuits are utilized only for those applications where the bypass techniques discussed in connection with FIGS. 2 and 2A are utilized. In any embodiment where bypass circuits are utilized it may be necessary, if control timing is critical, to insert delay in the bypass circuit to maintain signal phase uniformity with respect to network paths extending through bypassed stages.

Throughout the present description of the various figures of the drawing crosspoint switches of the coincidence gate type illustrated in FIG. 2A have been assumed for the matrix crosspoints. However, many other types of crosspoint switches are available in the art for performing corresponding selection functions. In particular, it is noted that crosspoint switches of the type disclosed and claimed in the aforementioned Marcus application include storage and limited time slot interchange functions at each crosspoint and are also advantageously useful in the present invention.

Although the present invention has been described in connection with particular embodiments and applications thereof, it is to be understood that additional modifications, embodiments, and applications, which are obvious to those skilled in the art, are included within the spirit and scope of the invention.

APPENDIX A

This Appendix presents a listing of an illustrative program for implementing the PATH subroutine already outlined in connection with the flowchart of FIG. 4. Included also are instructions to adapt the underlying machine operation to this textual presentation of the subroutine. Thus, instructions 1.01 through 1.22 represent the type of functions performed by a control program to supply line numbers of calling and called parties in a proper sequence. That sequence is here assumed to be the smaller line number, calling party, given first and then the larger number, called party. Instruction 1.30 through 2.70 represent most of the actual PATH subroutine of FIG. 4. Instructions 3.10 through 5.25 include a portion of the PATH subroutine but are primarily control program functions that represent for illustrative purposes the operations necessary to obtain the path connection data in printed tabular form in lieu of making the data available for storage in appropriate word locations of the system control memory.

The illustrative program assumes the switching network of FIGS. 2 and 3 in an environment that has a mirror image network wherein both networks are advantageously controlled by the same control memory outputs. Thus, there are 63 input lines, numbered zero through 62, to stage I. It is assumed also that detection of premature convergence results in the assignment of different time slots for calling and called parties if they are not already different. As previously described, the program utilizes the FOCAL program language and assumes operation on a PDP-8/I machine. Program statements in the left-hand column are not in the exact format necessary for immediate use since deviations from correct format have been employed to facilitate presentation of explanatory comments in the right-hand column.

| | | | | | | | | |
|---|---|---|---|---|---|---|---|---|
| 1A | 2 | 1 | 0 | 1 | 0 | 1 | 1 | 1 |
| 1B | 0 | 4 | 0 | 1 | 1 | 0 | 0 | 1 |
| 2A | 2 | 1 | 1 | 1 | 7 | 1 | 1 | 8 |
| 2B | 0 | 4 | 1 | 1 | 8 | 0 | 0 | 8 |
| 3A | 2 | 1 | 2 | 1 | 14 | 1 | 1 | 15 |
| 3B | 0 | 4 | 2 | 1 | 15 | 0 | 0 | 15 |

| | |
|---|---|
| 1.01 C-PATH MAY 11, 1971 | Name of program and date of illustrative run. |
| 1.10 ASK "WHICH LINES?" M,N | Get line numbers and set equal to M and N. |
| 1.20 IF (M-N)1.22,1.1,1.21 | Determine by an "IF" instruction that line numbers are different and that the larger one is equal to N: If N>M, jump to 1.22; if equal, request new line numbers; and if N<M, jump to 1.21. |
| 1.21 SET L=M; SET M=N; SET N=L | Interchange line number assignments to N and M. |
| 1.22 IF (N-63)1.3,1.1,1.1 | Test larger line number for valid numbers. If negative go to 1.3; otherwise request new numbers. |
| 1.30 SET S1=FITR(M/3); SET S2=FITR(N/3). | Divide line numbers M and N by 3; and set integer parts of quotients equal to S1 and S2, the corresponding stage I matrix numbers. |
| 1.31 SET T1=FITR(.1+3*(M/3-FITR(M/3))). 1.32 SET T2=FITR(.1+3*(N/3-FITR(N/3))). | Find stage I matrix input terminals T1 and T2 used by lines M and N: Subtract the matrix number from one-third of the line number; multiply the difference by 3; add .1 to prevent round-off error (in floating point operation used by illustrative machine); and take integer parts of the results as the terminal numbers. |
| 1.40 SET S3=FITR(S1/3); SET S4=FITR(S2/3). 1.41 SET T3=FITR(.1+3*(S1/3-S3)). 1.42 SET T4=FITR(.1+3*(S2/3-S4)). | Find stage II matrix and input terminal numbers for the upper one of the FIG. 2 three stage II-III arrays by using instructions 1.30 through 1.32, but taking as data the stage I switch numbers. |
| 1.60 IF (S2-S1)1.1,2.7,1.65 | "IF" instruction tests for early convergence by subtracting stage I matrix numbers: If negative go back to 1.1. If equal, go to 2.7. If positive, do the next test. |
| 1.65 IF (S4-S3)1.1,2.7,1.7 | Repeat convergence test for second stage switches. |
| 1.70 IF (S4-S3-2)2.1,2.2,1.8 1.80 IF (S4-S3-4)2.3,2.4,1.9 1.90 IF (S4-S3-6)2.5,2.6,1.1 | Find, in Table II in memory, line corresponding to the same switch number span as 53,54 by using the "IF" instruction. |
| 2.10 SET T5=1; SET S5=S3+1; SET T6=0; SET S5=0; GO 3.1. 2.20 SET T5=2; SET S5=S3+3; SET T6=1; SET TS=0; GO 3.1. 2.30 SET T5=2; SET S5=S3+3; SET T6=0; SET TS=0; GO 3.1. 2.40 SET T5=0; SET S5=S3; SET T6=2; TS=0; GO 3.1. 2.50 SET T5=1; SET S5=S3+1; SET T6=2; TS=0; GO 3.1. 2.60 SET T5=0; SET S5=S3; SET T6=1; SET TS=0; GO 3.1. | 2-series instructions set the characters of the Table II information equal to respective reference characters in preparation for forming a tabular print-out of the network connections for particular cases. (Digit to right of decimal in each 2-series instruction number corresponds to a line number of Table II.) Set T5 and T6 (stage II matrix output terminal numbers) equal to 0, 1, or 2 corresponding to a, b, or c in second and fourth columns, respectively, of Table II. Set S5 (stage III matrix number) equal to S3 (smaller stage II matrix number) plus 0, 1, or 3, according to third column of Table II. Set TS equal to zero because no premature convergence, and in all cases go to 3.10 and 3.11 for format statements to secure print-out of headings for tabular print-out of data obtained in the 2-series instructions. |
| 2.70 SET T5=0; SET S5=S3; SET T6=0; SET TS=1; GO 3.1. | If premature convergence was found in 1.60 or 1.65, set terminal numbers and matrix numbers for a predetermined single circuit, here assumed to be a straight path through network; and set TS equal to 1 to initiate assignment by control program of different time slots to calling and called parties. |
| 3.10 TYPE!," PATH STAGE I STAGE II STAGE III DIFF. TIME",! 3.11 TYPE " NO. TER MX TER TER MX TER TER MX SLOTS NEEDED?",!! | |
| 4.10 FOR I=0, 1, 2; DO 5 4.11 TYPE !! 4.20 GO 1.1 | Do the 5-series instructions for obtaining the three sets (I=0, 1, and 2) of data for the three path pair possibilities from the assigned matrices of stage I to the three arrays of stages II-III; and on completion wait for new line names. |
| 5.10 TYPE % 3.00, I+1, "A", T1, S1, I, T3, S3+7*I, T5, T5, S5+7*I. | Format statement for print-out of calling party optional connections, i.e., lines 1A, 2A, and 3A under table headings defined by the 3-series instructions. |
| 5.20 IF (TS) 5.22, 5.22, 5.21 | Test, by using TS as subtrahend in "IF" statement, whether or not premature convergence was indicated in 2-series instructions. If not, print out called party connections. |
| 5.21 TYPE " YES", | If 5.20 test is positive, type "Yes" in final column of table, before printing called party connections. |
| 5.22 TYPE !, % 3.00, I+1, "B", T2, S2, I, T4, S4+7*I, T6, T6, S5+7*I. 5.23 IF (TS) 5.25, 5.25, 5.24 5.24 TYPE " YES" | Format and test statements for lines 1B, 2B, and 3B under headings defined by 3-series instructions. |
| 5.25 TYPE !! | Carriage return. |

There follow tabular representations of four different types of pathfinding problems solved using the foregoing program. For each network stage matrix number "MX," there are indicated input and output terminal numbers "TER" to the left and right, respectively, where appropriate.

CONNECTION WITHOUT PREMATURE CONVERGENCE

WHICH LINES? 5 12

| Path | STAGE I | | | STAGE II | | | STAGE III | | Diff. Time Slots |
|---|---|---|---|---|---|---|---|---|---|
| No. | TER | MX | TER | TER | MX | TER | TER | MX | Needed? |

CONNECTION WITH PREMATURE CONVERGENCE - STAGE II

WHICH LINES? 1 5

| Path | STAGE I | | | STAGE II | | | STAGE III | | Diff. Time Slots |
|---|---|---|---|---|---|---|---|---|---|
| No. | TER | MX | TER | TER | MX | TER | TER | MX | Needed? |
| 1A | 1 | 0 | 0 | 0 | 0 | 0 | 0 | 0 | YES |
| 1B | 2 | 1 | 0 | 1 | 0 | 0 | 0 | 0 | YES |
| 2A | 1 | 0 | 1 | 0 | 7 | 0 | 0 | 7 | YES |
| 2B | 2 | 1 | 1 | 1 | 7 | 0 | 0 | 7 | YES |
| 3A | 1 | 0 | 2 | 0 | 14 | 0 | 0 | 14 | YES |
| 3B | 2 | 1 | 2 | 1 | 14 | 0 | 0 | 14 | YES |

CONNECTION WITH PREMATURE CONVERGENCE - STAGE I

ALSO REJECT EQUAL LINE NUMBERS

WHICH LINES? 1 1
WHICH LINES? 1 2

| Path | STAGE I | | | STAGE II | | | STAGE III | | Diff. Time |
|---|---|---|---|---|---|---|---|---|---|
| No. | TER | MX | TER | TER | MX | TER | TER | MX | Slots Needed? |
| 1A | 1 | 0 | 0 | 0 | 0 | 0 | 0 | 0 | YES |
| 1B | 2 | 0 | 0 | 0 | 0 | 0 | 0 | 0 | YES |
| 2A | 1 | 0 | 1 | 0 | 7 | 0 | 0 | 7 | YES |
| 2B | 2 | 0 | 1 | 0 | 7 | 0 | 0 | 7 | YES |
| 3A | 1 | 0 | 2 | 0 | 14 | 0 | 0 | 14 | YES |
| 3B | 2 | 0 | 2 | 0 | 14 | 0 | 0 | 14 | YES |

IMPOSSIBLE CONNECTIONS REJECTED

WHICH LINES? 1 65
WHICH LINES? 1 64
WHICH LINES? 1 63
WHICH LINES? 1 62

| Path | STAGE I | | | STAGE II | | | STAGE III | | Diff. Time |
|---|---|---|---|---|---|---|---|---|---|
| No. | TER | MX | TER | TER | MX | TER | TER | MX | Slots Needed? |
| 1A | 1 | 0 | 0 | 0 | 0 | 0 | 0 | 0 | |
| 1B | 2 | 20 | 0 | 2 | 6 | 1 | 1 | 0 | |
| 2A | 1 | 0 | 1 | 0 | 7 | 0 | 0 | 7 | |
| 2B | 2 | 20 | 1 | 2 | 13 | 1 | 1 | 7 | |
| 3A | 1 | 0 | 2 | 0 | 14 | 0 | 0 | 14 | |
| 3B | 2 | 20 | 2 | 2 | 20 | 1 | 1 | 14 | |

What is claimed is:

1. In combination, a first stage of plural switching arrays each including output terminals, a second stage of plural switching arrays each including input terminals, and means interconnecting each first stage switching array to only a portion of said second stage arrays, said interconnecting means including connecting links each extending between a different output terminal of said first stage and a discrete input terminal of said second stage, pairs of said links converging from any two different ones of said first stage arrays to a second stage array.

2. The combination in accordance with claim 1 in which said first stage arrays and said second stage arrays are arranged is ordered numerical sequences in their respective stages, said interconnecting means includes λ selectable pairs of links each connecting a different one of said second stage arrays with a common pair of said first stage arrays,

*v* arrays are provided in said first stage, and each of said first stage arrays has *k* output terminals and each of said second stage arrays has *k* input terminals, *v* and *k* being selected in relation to λ in accordance with a symmetrical, balanced, incomplete, block design so that a block identifying the number of arrays in said second stage ordered numerical sequence to which output terminals of one of said first stage arrays are connected defines the format of blocks for all other arrays of said first stage.

3. In combination, a first stage of plural switching arrays each including output terminals, said arrays being numbered in an ordered sequence, a second stage of plural switching arrays each said second stage array including input terminals, said second stage arrays being numbered in an ordered sequence, and means interconnecting output terminals of each first stage array to input terminals of only a portion of said second stage arrays, said interconnecting means comprising link connecting means from each first stage array to a different second stage array in said second stage sequence, and link connecting means from the same first stage array to plural additional second stage arrays, all second stage arrays linked to such first stage array being spaced in said second stage sequence to provide at least two different number spans, in said second stage sequence, between adjacent ones of such linked second stage arrays.

4. A method for finding a pair of connection paths between any selected pair of switching arrays of a first switching network stage and a switching array of a second switching network stage, the pathfinding being controlled by a data processing machine including a memory and operable in accordance with a program of stored instructions, said stages being interconnected by circuit links arranged in accordance with a cyclic balanced, incomplete, block design, said arrays being assigned, in their respective stages, numbers in an ordered numerical sequence, the method comprising the steps of establishing in said memory a table defining, for the lowest numbered one of said first stage arrays, a list of connection path pair identifier words, according to said block design, through said links to said second stage for array pairs with each other first stage switching array, each identifier including identification of an output terminal on said lowest numbered one of said first stage arrays, identification of one of said second stage switching arrays, and identification of an output terminal on the other one of said first stage arrays in the same first stage pair of arrays, determining an identification of a selected first stage first switching array which is to be paired with a selected second switching array of the same stage, finding the difference between said first and second array identifier numbers, securing from said table the identifier word corresponding to the one of said other first stage arrays having a number equal to said difference, and adding a subtrahend of the difference determination to the second stage array identifier in said corresponding word for finding, as a sum, the identification of a connecting one of said second stage arrays which is to be employed for pairing the selected first stage arrays.

5. In combination, a first stage of *v* switching arrays each including *nr* output connections, where *n* is a real positive integer at least equal to 1, a second stage of *b* switching arrays each including *nk* input connections, and means for interconnecting output connections for each different pair of said *v* switching arrays to inputs of predetermined ones of said *b* second stage arrays to provide λ interconnection circuit pairs between each of said first stage array pairs and said second stage, said interconnecting means comprising a plurality of circuit links, each link providing a sole connection between one of said $nr$ output connections and one of said $nk$ input connections, and said links which extend from any one of said $v$ arrays are distributed among said $b$ arrays, in accordance with a solution of a $(b,v,r,k\lambda)$-configuration of a balanced, incomplete, block design.

6. The combination in accordance with claim 5 in which each input connection of each said first stage switching array is a time division multiplex signal circuit including a plurality of sequential time slot signal channels recurring at a predetermined time division multiplex signal frame rate.

7. The combination in accordance with claim 5 in which there are provided an additional stage of plural switching arrays, and means for connecting a different output of each array of said additional stage to an input of each of said first stage arrays.

8. The combination in accordance with claim 5 in which there are provided an additional stage of plural switching arrays, and means for connecting said additional stage arrays to one of said first and second stages in accordance with a balanced, incomplete, block design.

9. The combination in accordance with claim 5 in which each of said arrays of at least one of said stages is a multistage switching network having its stages connected to one another in accordance with a balanced, incomplete, block design.

10. The combination in accordance with claim 5 in which said interconnecting means comprises at least an additional stage of plural switching arrays each having input connections and output connections, first means coupling said additional stage input connections to said first stage output connections, and second means coupling said additional stage output connections to said second stage input connections.

11. The combination in accordance with claim 5 in which said interconnecting means comprises time slot interchanging means having input connections and output connections, first means for coupling said interchanging means input connections to said first stage array output connections, and second means for coupling said interchanging means output connections to said second stage array input connections.

12. The combination in accordance with claim 11 in which said first and second coupling means include link connections to said first and second stages which are mirror images of one another.

13. The combination in accordance with claim 11 in which said first and second coupling means each includes at least one additional stage of switching arrays coupled to said first and second stages, respectively, in accordance with a balanced, incomplete, block design.

14. The combination in accordance with claim 13 in which there are provided in each of said first and second coupling means means for detecting in one of said stages, except a stage immediately adjacent to said time slot interchanging means, one of said interconnection circuit pairs having both circuits thereof in the same array of said one stage, and means for bypassing said one interconnection circuit pair from said same array around the remaining stages of said first or second coupling means to said time slot interchanger.

15. The combination in accordance with claim 5 in which said block design is a symmetric design in which $b$ and $v$ are equal, and $r$ and $k$ are equal.

16. The combination in accordance with claim 15 in which $\lambda$ is equal to 1, and said block design is a finite projective plane.

17. The combination in accordance with claim 15 in which $v$ and $k$ are not equal.

18. The combination in accordance with claim 15 in which $k$ is greater than $\lambda$ plus 1.

19. The combination in accordance with claim 15 in which $v$ is greater than $\lambda$ plus 2.

20. The combination in accordance with claim 15 in which $v$ is 7, $k$ is 3, and $\lambda$ is 1.

21. The combination in accordance with claim 15 in which $v$ is 15, $k$ is 7, and $\lambda$ is 3.

22. The combination in accordance with claim 15 in which $v$ is 85, $k$ is 21, and $\lambda$ is 5.

23. The combination in accordance with claim 15 in which each array of said first stage includes a group of crosspoint switching matrices, each matrix having output connections coupled by said interconnecting means to said second stage in accordance with said symmetric block design.

24. The combination in accordance with claim 23 in which each of said groups of matrices includes $n$ matrices having $k$ output connections, each second stage array has $kn$ input connections, and said solution is a difference set solution of said symmetric block design for each of such first stage groups and it is replicated $n$ times for such group.

25. The combination in accordance with claim 24 in which each array of said second stage is a multistage network having the stages thereof interconnected in accordance with a balanced, incomplete, block design having $kn$ input connections.

26. A method for selecting crosspoint switches for connecting circuit path pairs in switching arrays of a multistage switching network wherein a first and a second stage, each including a plurality of switching arrays, are interconnected by circuit links arranged in accordance with a symmetrical, balanced, incomplete, block design, the switch selection being controlled by a data processing machine including a memory and operable in accordance with a program of stored instructions, said memory having stored therein a table of three-character words identifying for a first array of a first one of said stages and for all other first stage arrays with which said first array can be paired the array output terminals that must be used to converge link paths from such array pair to a common second stage array, said method comprising the steps of:

identifying the difference between array numbers of two first stage arrays to be paired, entering said table at an array number corresponding to said difference, adding to the second stage array number, at the table entry, the subtrahend previously used to get the difference, and initiating a selection of crosspoint switches in the two first stage arrays to connect the terminals indicated at the table entry, of the two paired arrays to the second stage array number resulting from the adding step.

* * * * *

UNITED STATES PATENT OFFICE
CERTIFICATE OF CORRECTION

Patent No. 3,701,112 Dated November 8, 1972

Inventor(s) David W. Hagelbarger

It is certified that error appears in the above-identified patent and that said Letters Patent are hereby corrected as shown below:

In the Abstract, line 5, "for outputs" should be --from outputs--. Col. 2, line 64, "(b,v,r,k,)" should be --(b,v,r,k,$\lambda$)--. Col. 5, last line, "outputs" should be --Outputs--. Col. 8, line 15, "pane" should be --plane--. Col. 9, line 4, "bocks" should be --blocks--. Col. 10, line 37, after "in" insert --a--. Col. 12, lines 51 and 52, "Introduction to Programming - Small Computer Handbook Series" should be underscored. Col. 14, line 9, "input" should be --output--; line 19, "0,1,2,4,5,8,0" should be --0,1,2,4,5,8,10--. Col. 18, 8th paragraph, "stage II-II" should be --stage II-III--. Col. 17, in the program statement beginning "2.10", the 4th SET group "SET S5=0" should be --SET TS=0--. In the program statement beginning "2.40", in the 4th grouping, before "TS" insert --SET--. In the program statement beginning "2.50", in the 4th grouping, before "TS" insert --SET--. Col. 19, line 47, "is" should be --in--.

Signed and sealed this 10th day of April 1973.

(SEAL)
Attest:

EDWARD M.FLETCHER,JR.
Attesting Officer

ROBERT GOTTSCHALK
Commissioner of Patents